United States Patent [19]

Tsai

[11] Patent Number: 4,595,209
[45] Date of Patent: Jun. 17, 1986

[54] SKATEBOARD

[75] Inventor: Kun K. Tsai, Tai Chung Hsing, Taiwan

[73] Assignee: Li Mao Sports Co., Inc., Taiwan

[21] Appl. No.: 598,021

[22] Filed: Apr. 9, 1984

Related U.S. Application Data

[63] Continuation-in-part of Ser. No. 531,698, Sep. 13, 1983.

[51] Int. Cl.$^4$ .................. A63C 1/00; A63C 17/14
[52] U.S. Cl. .................. 280/11.115; 280/11.2; 280/87.04 A; 188/74; 192/12 B; 192/17 R
[58] Field of Search .......... 280/1.115, 80.04 A, 280/80.04 R, 243, 251, 11.20; 180/180, 181; 188/71.2, 74; 192/17 R, 50, 93 R, 12 B

[56] References Cited

U.S. PATENT DOCUMENTS 1,628,559  5/1927  Showers ............................ 280/11.2

FOREIGN PATENT DOCUMENTS 2447210  9/1980  France ............................ 280/11.15

*Primary Examiner*—David M. Mitchell
*Assistant Examiner*—Eric D. Culbreth
*Attorney, Agent, or Firm*—Oblon, Fisher, Spivak, McClelland & Maier

[57] ABSTRACT

A manually powered skateboard which includes a transmission wheel mounted on a rear wheel axle and coaxial with a rear hub having a rear wheel mounted thereon. The transmission wheel is connected to the rear hub through a one-way clutch. A drive wheel mounted on a drive shaft which is disposed under a platform to drive the transmission wheel, and is parallel to the rear wheel axle. A first flexible tension element is wound on the drive wheel and pullable by a user to rotate the drive wheel and in turn the transmission wheel. The first spring is acting on the drive wheel to wind up the tension element. A brake cam cooperates with the drive wheel through a clutch to selectively rotate with the drive wheel to effect the brake action to the rim of the rear wheel. The clutch is actuated by a brake pedal disposed on the front region of the platform. Thus the braking action is effected only by clutching the drive wheel to the brake cam. The concurrent operations of pulling the tension element to drive the wheel and pressing on the brake pedal to brake the skateboard enable the user to maintain his balance when the skateboard is abruptly braked.

14 Claims, 4 Drawing Figures

SKATEBOARD

CROSS-REFERENCE TO RELATED APPLICATION

This application is a continuation-in-part application of U.S. patent application Ser. No. 531,698, abandoned filed on Sept. 13, 1983.

BACKGROUND OF THE INVENTION

1. Field of the Invention

The present invention relates to a skateboard which is manually powered.

2. Discussion of the Background

Unpowered skateboards rely for their movement on the user pushing against the ground with one foot, and/or the force of gravity when the skateboard is used on a sloping surface. In U.S. patent application Ser. No. 531,698, it is disclosed a skateboard which can be driven by the user on a level surface, i.e. without the aid of gravity, with both of the user's feet on the board. In the above-referenced application, a skateboard is designed to have a manually powered drive means for a driven wheel thereof, comprising a drive wheel coaxial with a rear hub member mounting said driven wheel and connected thereto through a one-way clutch, a flexible tension element wound on said drive wheel and pullable by a user to rotate the drive wheel and thereby to drive said driven wheel, and spring means acting on the drive wheel to wind up the tension element. Adjacent said hub member, a brake shoe is disposed for braking said hub member, A brake operating lever pivotally mounted under the skateboard platform at the front thereof and having one end operatively connected to said brake shoe and another end extending above the front end of the platform and formed as a pedal engageable by a user's foot. Such a skateboard has a disadvantage in that whenever braking is needed, the pressing action of the user's foot on the pedal located at the far front end of the platform will undesirably cause the user's body to tilt forward. Especially when the skateboard is abruptly braked, the user is liable to slip off due to the difficulty in immediately restoring the body in balance. Therefore, an amelioration made on the above-referenced skateboard is attempted.

SUMMARY OF THE INVENTION

It is an object of the present invention to provide a skateboard which is safer to the user when the braking action is actuated.

The concept of the present invention is that the brake action actuated by the user's foot will be effected only when the user pulls a flexible tension element to drive the skateboard forward. In this situation, the forward tilting of the user's body will be counterbalanced by the backward pulling of the flexible tension element.

In accordance with the present invention, a manually powered skateboard of the type in which a transmission wheel is mounted on a rear wheel axle, and coaxial with a rear hub member having a rear wheel mounted thereon, said transmission wheel being connected to said rear hub member through a one-way clutch; a drive wheel mounted on a drive shaft which is disposed under a platform to drive said transmission wheel, and said drive shaft being in a parallel position relative to said rear wheel axle, a first flexible tension element wound on said drive wheel pullable by a user to rotate said drive wheel and in turn said transmission wheel, first spring means biased against the driven rotational force of said drive wheel by the pulling of said first flexible tension element for winding up said tension element, and brake means cooperating with said drive wheel through a clutch member to selectively rotate with said drive wheel to effect the brake action on the rim of said rear wheel.

Preferably, said brake means includes a cam fixedly mounted on said drive shaft to engage with the rim of said rear wheel for actuating the brake action. Said drive shaft is of non-circular cross section, and said drive wheel is rotatable with respect to said drive shaft through a bearing member. Said clutch member includes a clutch ring mounted on said drive shaft and capable of being shifted in an axial position relative to said drive shaft, said clutch ring having a clutch plate for engaging with a lateral surface of said drive wheel. A plurality of protrusions and recesses are further disposed annularly on said clutch plate and said lateral surface of said drive wheel respectively to mesh with each other when clutched. A cam is further rotatably disposed underneath said platform for thrusting said clutch ring to shift in the axial direction.

Peferably, said cam disposed underneath the platform includes a stud member disposed thereon, and said clutch ring includes two spaced annular plated coaxial with said clutch plate, for inserting said stud member, such that when said cam is rotated, said stud member will drive either one of said annular plates to engage or disengage said clutch plate with or from said drive wheel. A second spring means is further disposed between said cam disposed underneath the platform and the underside of said platform for biassing against the shifting of said clutch plate toward said drive wheel. A clutch lever is further disposed on said cam member for rotating said cam disposed underneath the platform to actuate the braking action. A clutch operating tension element is further provided for pulling said clutch lever.

Preferably, a pulley is further disposed on the front portion of said platform for guiding said clutch operating tension element upwardly of said platform. A brake pedal is further pivotally disposed on the front region of said platform for connecting with said clutch operating tension element, said brake pedal being engageable by the user's foot. Said clutch operating tension element is pulled by depressing the rear portion of said brake pedal toward said platform. The rear portion of said brake pedal is spring biassed upwardly.

Preferably, said brake pedal is a steering plate disposed on the front region of said platform and is connected to a front wheel axle by a steering shaft extending rotatably through said platform.

BRIEF DESCRIPTION OF THE DRAWINGS

A more complete appreciation of the invention and many of the attendant advantages thereof will be readily obtained as the same becomes better understood be reference to the following detailed description when considered in connection with the accompanying drawings, wherein.

DESCRIPTION OF THE PREFERRED EMBODIMENT

Figure 1:
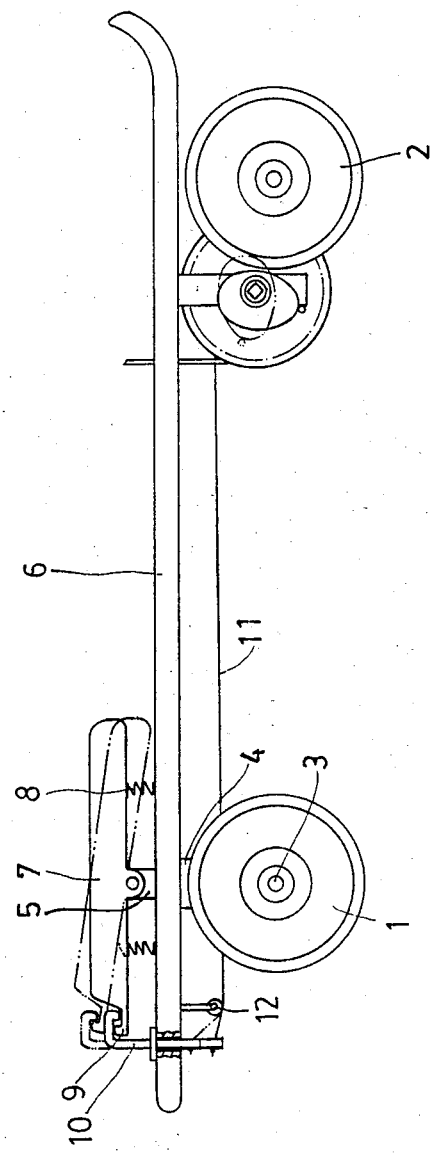
FIG. 1 is a schematic side view in partial section of a skateboard according to the present invention.
Figure 2:
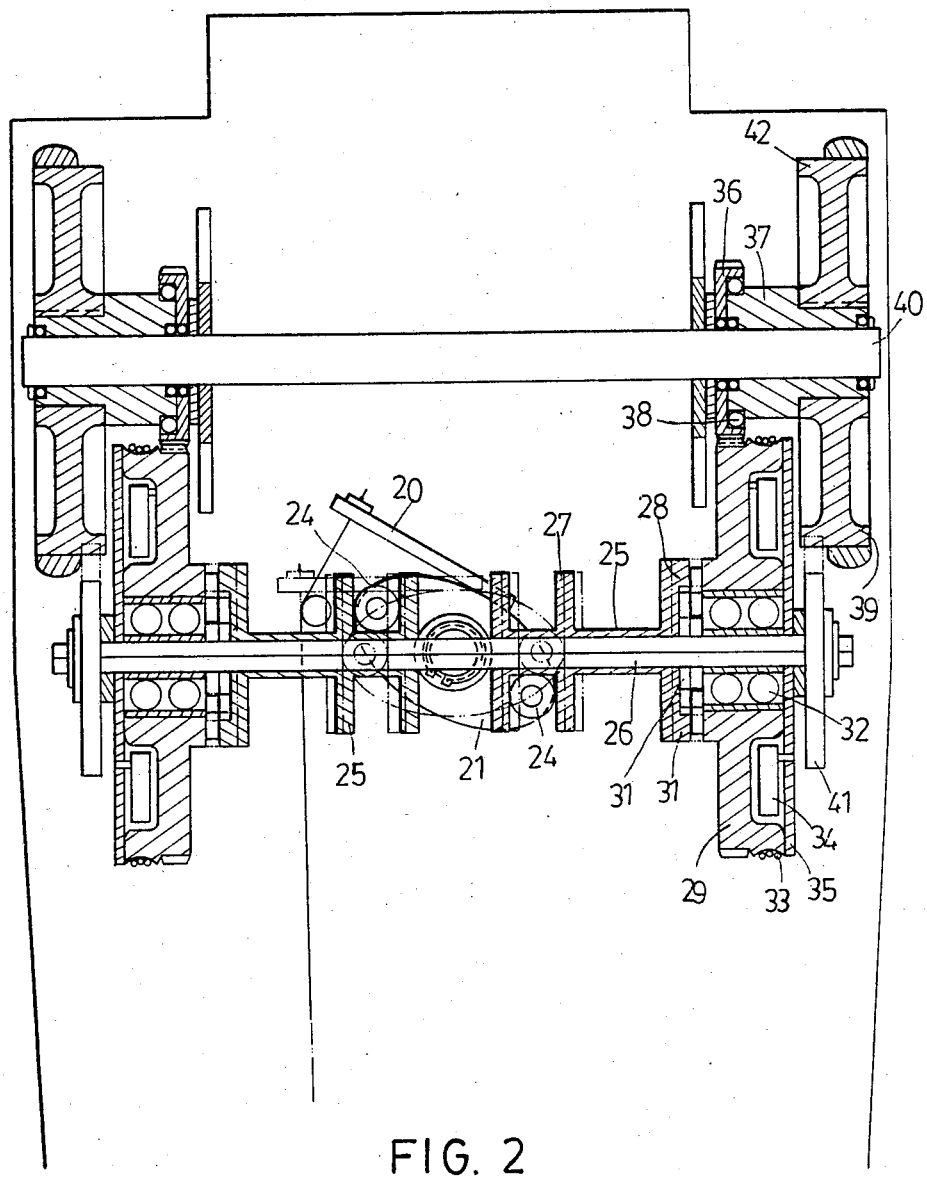
FIG. 2 is a schematic bottom view in partial section of the rear region of the skateboard according to the present invention.

As shown in FIG. 1, there is shown a skateboard including a pair of front wheels 1 and a pair of rear wheels 2. In FIG. 1, only one of each pair is depicted. A front frame 4 rotatably mounting a front wheel axle 3 is steered by a steering shaft 5. The steering shaft 5 is extending rotatably through a platform 6 for pivoting a steering plate 7. The steering plate 7 in this embodiment is also acted as a brake pedal 7 which constitutes one of the features in this invention. The rear portion of the brake pedal 7 is biassed upwardly by a spring 8. The front edge of the front portion of the brake pedal 7 is formed as a hook 9 for engaging an end of a brake operating lever 10 which is extending through and downwardly of the platform 6. It will be noted that the braking action is effected by means of a clutch mechanism. Thus, some elements incorporated in the braking operation will be designated in terms of clutch function. A clutch operating tension element 11 has one end connected to the brake operating lever 10, and another end connected to a clutch lever 20 as shown in FIG. 2 for transmitting pressing action on the rear portion of the brake pedal 7 to pull the clutch lever 20. The clutch operating tension element 11 is preferably guided by a pulley 12 disposed underneath the platform 6.

Figure 3:
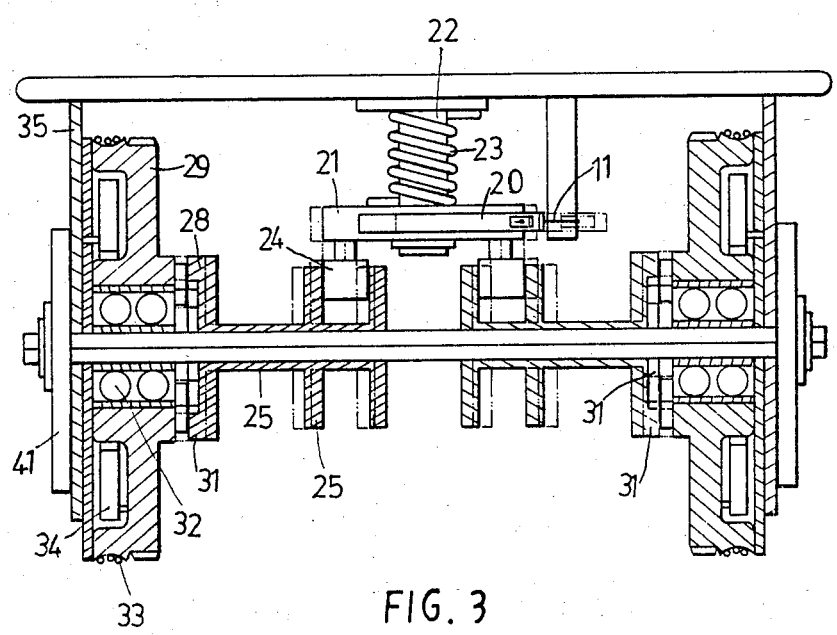
FIG. 3 is a schematic rear view in partial section of the rear region of the skateboard shown in FIG. 2.
Figure 4:
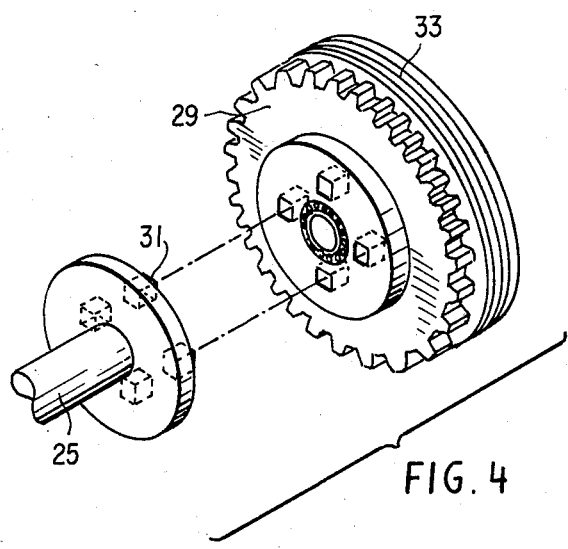
FIG. 4 is a detailed view of the clutch and drive wheel of the present invention.

As shown in FIGS. 2, 3 and 4, a cam 21 is ellipse-shaped and rotatably mounted on a second cam shaft 22. A spring 23 is sleeved on the second cam shaft 22 and has one end connected to the cam 21 and another end connected to the underside of the platform 6 to bias against the rotation of the cam 21 actuated by the clutch lever 20. Two stud members 24 are disposed separately on the cam 21 and symmetrical to the center of the cam 21. A pair of clutch rings 25 are mounted on a drive shaft of square cross section 26 and are allowed to move only in the axial direction of the drive shaft 26. Each clutch ring 25 allows two spaced annular plates 27 coaxial with a clutch plate 28. The stud member 24 is inserted in the space between the two annular plates 27 for driving the clutch ring 25 to shift toward each drive wheel 29. A plurality of protrusions 31 and recesses are separately disposed annularly on the opposing faces of the clutch plate 28 and the drive wheel 29 for engagement and disengagement of the latter two members. The drive wheel 29 is rotatably mounted on the drive shaft 26 through a ball bearing 32 and rotated by pulling a flexible tension element 33 wound on the drive wheel 29. A second spring means 34 is disposed in and coaxial with the drive wheel, and having one end attached to a rear frame 35 for acting on the drive wheel to wind up the tension element. On the rim of the drive wheel 29 a toothed portion is provided for meshing a corresponding toothed portion on the rim of a transmission wheel which is connected to the rear hub member 37 through a one-way clutch 38. As a result the rotation of the drive wheel 29 by a tension element 33 will be transmitted through the toothed portion to the transmission wheel 36. By means of a one-way clutch 38, only one directional rotation of the transmission wheel 36 could be utilized to drive the rear hub member 37 so as to roll the rear wheel 39 forward. The rear hub member 37, the transmission wheel 36 and the rear wheel 39 are coaxially mounted on a rear wheel axle 40 which is disposed in parallel position relative to the drive shaft 26. A brake cam 41 is fixedly mounted on the drive shaft 26 and adjacent to the rim 42 of the rear wheel 39 for stopping the rotation of the latter.

The braking operation according to the present invention will be described more clearly hereinbelow. When the user's foot is pressing down the rear portion of the brake pedal 7, the second tension element 11 will be pulled and the second cam 21 will be twisted to a position as shown in phantom line. At this moment, the stud member 24 will drive the annular plate 27 to shift towards the drive wheel 29. As the clutch plate engages with the lateral wall of the drive wheel 29, the clutch ring 25 as well as the drive shaft 26 will be driven to rotate. Thus the brake cam 41 will be actuated to be brought into contact with the rim of the rear wheel to effect the braking action. It can be noted that while the brake pedal 7 is pressed to bring the brake cam 41 engage the rim of the rear wheel 39, the first tension element 33 is also pulled by the user's hand to rotate the drive wheel 29. In this circumference, the forward leaning of the user's body caused by pressing on the brake pedal will be quickly counterbalanced by holding the first tension element backward when driving the drive wheel 29. As a consequence, the gravity of the body can be easily kept in a desired balance position.

While the invention has been described in connection with what is presently considered to be the most practical and preferred embodiments, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structure.

We claim:

1. A manually powered skateboard, comprising:
   a rear wheel axle;
   a rear hub member having a rear wheel mounted thereon;
   a transmission wheel mounted on said rear wheel axle, and coaxial with said rear hub member;
   means for connecting said transmission wheel to said rear hub member and which comprises a one-way clutch; a drive wheel engaged with said transmission wheel; a drive shaft disposed under a platform to drive said transmission wheel and on which said drive wheel is mounted, said drive shaft being in a parallel position relative to said rear wheel axle; a flexible tension element located in an axial position relative to said rear axle and wound on said drive wheel and pullable by a user to rotate said drive wheel and in turn said transmission wheel, and first spring means acting against a drive rotation of said drive wheel caused by pulling of said flexible tension element; a clutch member for selectively rotating with said drive wheel to effect braking action on a rim portion of said rear wheel; and brake means engageable with said clutch member.

2. A skateboard as claimed in claim 1, wherein said drive wheel is rotatable with respect to said drive shaft through a bearing member.

3. A skateboard as claimed in claim 2 wherein said clutch member includes a clutch ring mounted on said drive shaft and further comprises means for shifting said clutch ring in an axial position relative to said drive shaft, and wherein said clutch ring further comprises a clutch plate for engaging with a lateral surface of said drive wheel.

4. A skateboard as claimed in claim 3, wherein said clutch plate further comprises a plurality of protrusions and said drive wheel includes recesses annularly disposed thereon and wherein said lateral surface of said drive wheel meshes with said clutch plate when clutched.

5. A skateboard as claimed in claim 4, wherein said means for shifting said clutch ring comprises a cam rotatably disposed underneath said platform for shifting said clutch ring in an axial direction.

6. A skateboard as claimed in claim 5, wherein said cam rotatably disposed underneath said platform further comprises a stud member disposed thereon, and wherein said clutch ring further comprises first and second spaced annular plates coaxial with said clutch plates, for positioning of said stud member therebetween, such that when said cam is rotated, said stud member will drive either of said first and second annular plates to engage or disengage said clutch plate with or from said drive wheel, respectively.

7. A skateboard as claimed in claim 6, further comprising second spring means disposed between said cam and the underside of said platform for biasing against the shifting of said clutch plate toward said drive wheel.

8. A skateboard as claimed in claim 7, further comprising a clutch lever disposed on said cam rotatably disposed underneath said platform for rotating said cam rotatably disposed underneath said platform so as to actuate the braking action.

9. A skateboard as claimed in claim 8, further comprising a clutch operating tension element provided for pulling said clutch lever.

10. A skateboard as claimed in claim 9, further comprising a pulley disposed on a front portion of said platform for guiding said clutch operating tension element upwardly of said platform.

11. A skateboard as claimed in claim 10, further comprising a brake pedal pivotally disposed on a front region of said platform for connecting with said clutch operating tension element wherein said brake pedal is engageable by a foot of said user.

12. A skateboard as claimed in claim 11, wherein said tension element engageable by depressing the rear portion of said brake pedal toward said platform.

13. A skateboard as claimed in claim 12, further comprising means for biasing the rear portion of said brake pedal upwardly.

14. A skateboard as claimed in claim 13, further comprising a front wheel axle and a steering shaft rotatably extending through said platform wherein said brake pedal further comprises a steering plate disposed on the front region of said platform and is connected to said front wheel axle by said steering shaft extending rotatably through said platform.

* * * * *